Susumu TADAKUMA &
Yasuaki MIYAZAKI,
INVENTORS

FIG. 3a
FIG. 3b
FIG. 3c
FIG. 3d — off / — on
FIG. 3e — $v_H$ / — $v_L$
FIG. 3f — I / — 0
FIG. 3g
FIG. 3h
FIG. 3i
FIG. 3j
FIG. 3k
FIG. 3l
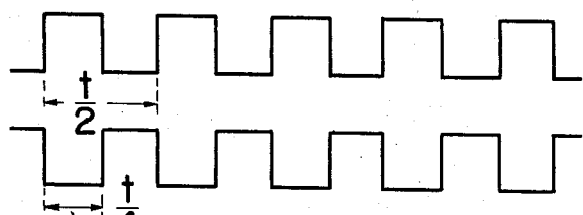
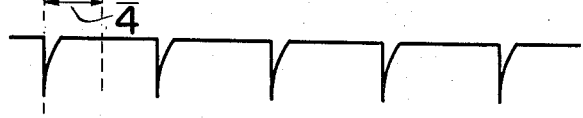
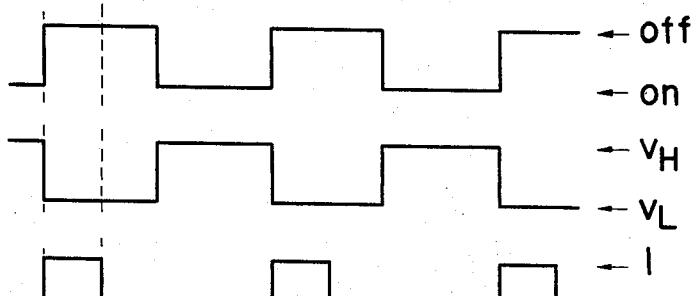
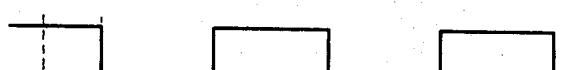

Nov. 24, 1970  SUSUMU TADAKUMA ET AL  3,543,114
DRIVE MEANS FOR 2-PHASE MOTOR
Filed July 5, 1968  6 Sheets-Sheet 4

FIG. 8b

← off
← on

United States Patent Office 3,543,114
Patented Nov. 24, 1970

3,543,114
DRIVE MEANS FOR 2-PHASE MOTOR
Susumu Tadakuma and Yasuaki Miyazaki, Yokohama-shi, Japan, assignors to Tokyo Shibaura Electric Co., Ltd., Kawasaki-shi, Japan, a corporation of Japan
Filed July 5, 1968, Ser. No. 742,767
Claims priority, application Japan, July 8, 1967, 42/43,622, 42/43,623
Int. Cl. H02p 5/40
U.S. Cl. 318—227
2 Claims

ABSTRACT OF THE DISCLOSURE

A drive means for a 2-phase motor which supplies first and second exciting coils for the stator magnetic pole arranged at a prescribed angular interval around the rotor of the 2-phase motor with first and second exciting currents having the same period and yet a phase differential of 90°. The second exciting current is produced in response to the first exciting current using a logical circuit or an interlocking circuit.

BACKGROUND OF THE INVENTION

The 2-phase motor comprises a rotor, first and second stator magnetic poles arranged at a prescribed angular interval around the rotor and first and second exciting coils for the stator magnetic poles respectively wound about the two poles. The 2-phase motor is driven by supplying the two exciting coils with exciting currents having a prescribed phase differential of, for example, 90° therebetween. The rotating direction of the rotor of the 2-phase motor is determined according to whether each of the two exciting currents advances beyond or lags behind the other by 90° in respect of phase. One of the conventional drive means for obtaining the aforementioned two exciting currents consists in generating a rectangular wave exciting current using two flip-flop circuits. This drive means comprises one rectangular wave signal oscillator and two flip-flop circuits. It enables two signals having a phase differential of 90° to be easily obtained from the two flip-flop circuits as exciting currents by operating said flip-flop circuits by the aforesaid rectangular wave signal.

As is well known, however, each of the flip-flop circuits comprises two transistors. When a source switch is closed to start the 2-phase motor it is uncertain due to the intrinsic different qualities of these two transistors which of them is first turned on. Therefore, depending on the manner in which the ON and OFF conditions of the two transistors are combined, there may sometimes occur the reversion of the relationship between the signals supplied to the first and second exciting coils with respect to the lead or lag of 90° phase differential. Therefore it has been impossible to foresee in which direction the rotor of the 2-phase motor will rotate at its start, thus causing a great deal of inconvenience.

SUMMARY OF THE INVENTION

It is accordingly the primary object of the present invention to provide a drive means for a 2-phase motor which enables the rotor always to rotate in a prescribed direction.

Another object of the invention is to provide a drive means for a 2-phase motor of very simple construction and capable of controlling the rotation of a rotor to any desired direction.

A further object of the invention is to provide a drive means for a 2-phase motor capable of reversing the rotating direction of a rotor with great ease by slightly changing the circuit connection.

More concretely, the present invention provides a drive means for a 2-phase motor consisting of a means for oscillating a rectangular wave signal having a prescribed period, a means for receiving a rectangular wave signal from the oscillating means and issuing a first exciting current having a period twice that of the rectangular wave signal to be supplied to the exciting coil for the first stator hagnetic pole of the 2-phase motor and a means operable in response to the first exciting current produced by said means and generating a second exciting current to be supplied to a second exciting coil for the second stator magnetic pole disposed at a prescribed angular interval around the rotor of the 2-phase motor; said second exciting current having the same period as the first exciting current and yet lagging behind it by 90° phase differential.

BRIEF DESCRIPTION OF THE DRAWINGS

FIGS. 3a to 3e and FIGS. 4a to 4i show signal wave forms by way of explaining the operation of the drive means of FIG. 2;

FIGS. 8a to 8j and FIGS. 9a to 9f indicate signal wave forms to illustrate the operation of the drive means of FIG. 7;

Figure 1:
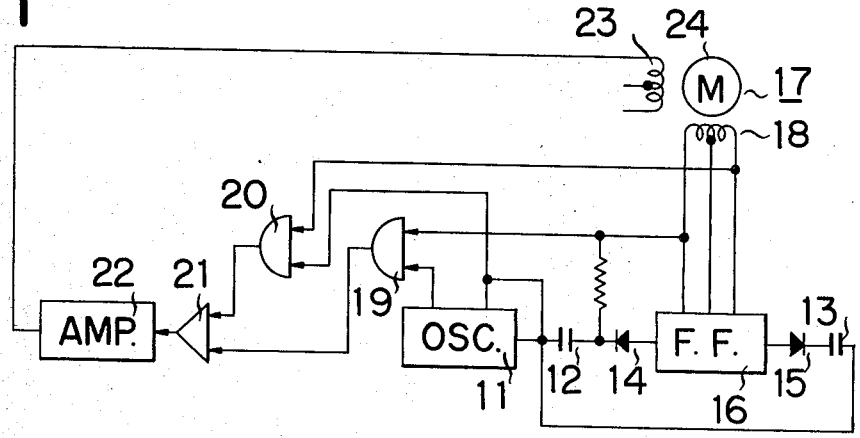
FIG. 1 is a schematic diagram of the circuit used in a drive means for a 2-phase motor according to an embodiment of the present invention.

There will now be described the present invention by reference to FIG. 1 first. Reference numeral 11 represents a low frequency wave oscillator. The frequency of waves oscillated thereby is set at a frequency $2f$ which is equivalent to twice the frequency $f$ (period $t=1/f$) of the voltage impressed on the later described exciting coils for the stator magnetic poles of the 2-phase motor. To one output side of the low frequency wave oscillator 11 is connected a flip-flop circuit 16 together with condensers 12 and 13 and diodes 14 and 15 of indicated polarity. To the output side of the flip-flop circuit 16 is connected a first stator exciting coil of the 2-phase motor 17. One output from the low frequency wave oscillator 11 and one output from the flip-flop circuit 16 are introduced to a first AND circuit 19. The other output from the low frequency wave oscillator 11 and the other output from the flip-flop circuit 16 are transmitted to a second AND circuit 20. The output from the first and second AND circuits 19 and 20 are transferred to an OR circuit 21. The output side of the OR circuit 21 is connected through an amplifier 22 to a second stator exciting coil 23 of the 2-phase motor 17. Reference numeral 24 denotes a rotor. There will now be further detailed the aforementioned construction by reference to FIG. 2 showing an actual circuit. The low frequency wave oscillator 11 is fabricated in the following manner. Let us take the case as an example where there is used an astable multivibrator. Of the two NPN junction transistors 31 and 32 constituting the multivibrator, the collector region of, for example, the transistor 31 is connected to a source +B through a resistor 33 and also to the base region of the transistor 32 through a condenser 34. And the contact point between the base region and the condenser 34 is connected to the source +B through a resistor 35. The collector region of the transistor 32 is connected to the source +B through a resistor 36, and also to the base region of the transistor 31 through a condenser 37. The contact point between this base region and the condenser 37 is connected to the source +B through a resistor 38. The emitter region of the transistors 31 and 32 are grounded in common. Further, the collector side of the transistor 32 contacts the diode 14 through the condenser 12 so as to turn on the diode 14. When there is introduced the negative pulse output from the transistor 32 (because it has an NPN junction), and is grounded through a resistor 39. Of another pair of transistors 40 and 41, the base region of, for example, the transistor 40 is connected to the contact point between the diode 14 and resistor 39 and also to the collector region of the transistor 41 through a resistor 42. As in the transistor 40, the base region of the transistor 41 contacts the diode 15 through the condenser 13 via the contact point between the collector region of the transistor 32 of the multivibrator and the condenser 12 so as to turn on the diode 15 when there is introduced the negative pulse output from the transistor 32 (because it has an NPN junction) and is grounded through a resistor 43. Further between the contact point of the base region of the transistor 41 and the resistor 43 and the collector region of the transistor 40 there is connected a resistor 44. The emitter regions of the transistors 40 and 41 are connected in common and the transistors 40 and 41 are grounded through resistors 45 and 46 respectively. The contact point of the condenser 12 and diode 14 is connected through a resistor 47 to the collector region of the transistor 40. Similarly, the contact point of the condenser 13 and diode 15 is connected through a resistor 48 to the collector region of the transistor 41.

Between a terminal led out from the middle point of one stator exciting coil 18 of the 2-phase motor connected across the collector regions of the transistors 40 and 41 and one terminal of the coil 18, and between said middle terminal and the other terminal of the coil 18 respectively are connected protective diodes 49 and 50 in opposite directions as viewed from the aforesaid middle point. The contact point of the diodes 49 and 50 is connected to the source +B. The first AND circuit 19 is constructed in the following manner which receives the output from the collector region of the transistor 40 and the output from the collector region of the transistor 31 of the astable multivibrator. Namely, the contact point of the collector region of the transistor 40 and the resistor 47 is connected to the cathode of a diode 51. The collector side of the transistor 31 of the multivibrator 11 is connected to the cathode of a diode 52 of the first AND circuit 19. The diodes 51 and 52 are connected in common to the source +B through a resistor 53. There will now be described the construction of the second AND circuit 20 which receives the output from the collector region of the transistor 41 of the flip-flop circuit 16 and the output from the collector region of the transistor 32 of the astable multivibrator 11. The collector region of the transistor 41 is connected to the cathode of a diode 54, and the collector region of the transistor 32 is connected to the cathode of a diode 55. The anodes of the diodes 54 and 55 are connected in common to the source +B through a resistor 56. Next there will be described the OR circuit which receives the output from the first and second AND circuits 19 and 20. The anodes of the diodes 51 and 52 of the first AND circuit 19 are connected to the anode of a diode 57, and the anodes of the diodes 54 and 55 of the second AND circuit 20 are connected to the anode of a diode 58. The cathodes of the diodes 57 and 58 are connected to the base region of a transistor 59 which forms, for example, a Schmidt circuit as an amplifier. The collector region of the transistor 59 is connected to the base region of the transistor 61 through a resistor 60, and is grounded through a resistor 62. The emitter region of the transistor 59 and the emitter region of the transistor 61 are connected and grounded through a resistor 63. Between a terminal led out from the middle point of the other stator exciting coil 23 of the 2-phase motor 17 connected across the collector regions of the transistors 59 and 61 and one terminal of the stator exciting coil 23, and between the middle terminal and the other terminal of the coil 23 respectively are connected diodes 64 and 65 in opposite directions as viewed from the middle point. The contact point of the diodes 64 and 65 is connected to the source +B.

There will now be described by reference to FIG. 1 the operation of a drive means for a 2-phase motor constructed as described above in accordance with an embodiment of the present invention. The frequency oscillated by the low frequency wave oscillator 11 is set at a frequency $2f$ which is equivalent to twice the frequency $f$ (period $t=1/f$) of the voltage impressed on the stator exciting coils 18 and 23 of the 2-phase motor. The output from the low frequency wave oscillator 11 is supplied to the flip-flop circuit 16 and also to the first and second AND circuits 19 and 20. Further to these AND circuits 19 and 20 is added the output from the flip-flop circuit 16. The output from the flip-flop circuit 16 is transmitted to the stator exciting coil 18, and the outputs from the AND circuits 19 and 20 are carried to the OR circuit 21. The output from the OR circuit 21 is amplified by the amplifier 22, and introduced to the other stator exciting coil 23. The aforementioned means can produce a 2-phase alternating current having a frequency $f$ whose phase rotation has been regulated by the AND circuit 19 or 20. There will now be described the operation of a drive means according to this embodiment by reference to FIG. 2. The frequency of the multivibrator used as the low frequency wave oscillator 11 is, $$2f = \frac{1}{0.7(C_1R_2 + C_2R_4)}$$

where $C_1$ and $C_2$ respectively are the static capacities of the condensers 34 and 37 and $R_2$ and $R_4$ respectively are the resistance values of the resistors 35 and 38). However, to obtain a 2-phase voltage of 90° phase differential, $C_1R_2$ is made equal to $C_2R_4$. There will now be described the wave form of FIGS. 3a to 3l and FIGS. 4a to 4i.

FIG. 3a=wave form of collector voltage of transistor 1

FIG. 3b=wave form of collector voltage of transistor 2

FIG. 3c=wave form of input signal to transistors 3 and 4

FIG. 3d=wave form of collector voltage of transistor 3

FIG. 3e=wave form of collector voltage of transistor 4

FIG. 3f=wave form of output from AND circuit 15

FIG. 3g=wave form of output from AND circuit 16

FIG. 3h=wave form of output from OR circuit 17

FIG. 3i=wave form of collector voltage of transistor 5

FIG. 3j=wave form of collector voltage of transistor 6

FIG. 3k=wave form of terminal voltage of stator exciting coil 14

FIG. 3l=wave form of terminal voltage of stator exciting coil 19

Figure 4A:

FIG. 4a=wave form of collector voltage of transistor 3

Figure 4B:
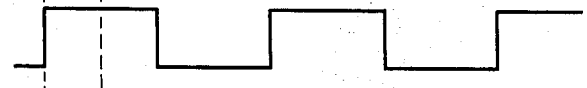

FIG. 4b=wave form of collector voltage of transistor 4

Figure 4C:

FIG. 4c=wave form of output from AND circuit 15

Figure 4D:

FIG. 4d=wave form of output from AND circuit 16

Figure 4E:
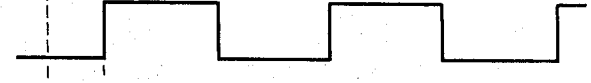

FIG. 4e=wave form of output from OR circuit 17

Figure 4F:
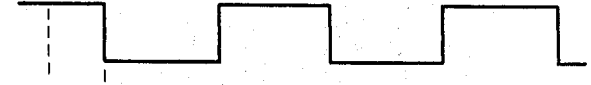

FIG. 4f=wave form of collector voltage of transistor 5

Figure 4G:
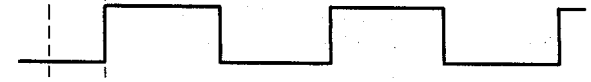

FIG. 4g=wave form of collector voltage of transistor 6

Figure 4H:

FIG. 4h=wave form of terminal voltage of stator exciting coil 14

Figure 4I:
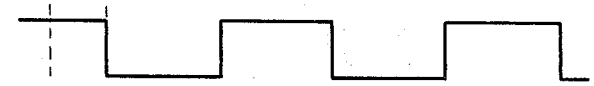

FIG. 4i=wave form of terminal voltage of stator exciting coil 19.

When a source switch is closed it is uncertain which of the transistors 40 and 41 of the flip-flop circuit 16 is turned on or off. To check this point, let us consider by reference to the wave forms of FIGS. 3a to 3l the case where the transistor 40 is turned on and the transistor 41 is turned off. When the differentiated pulse wave shown in FIG. 3c of the multivibrator 11 is supplied to the flip-flop circuit 16, then the transistor 40 is turned off (FIG. 3d) and the transistor 41 is turned on (FIG. 3e). Under this condition, let us consider only the initial period $t/4$ ($t$ denotes the output period of the flip-flop circuit 16). And in every case let the higher voltage be denoted by $V_H$ and the lower voltage by $V_L$. However, it will be understood that $V_H$ does not always represent the same value, but simply that $V_H$ is larger than $V_L$. To the diode 52 of the first AND circuit 19 is supplied the output $V_H$ (FIG. 3a) from the transistor 31 of the multivibrator only for a period of $t/4$ and is also added the output $V_L$ for another period of $t/4$. To the diode 51 is supplied the output $V_H$ (FIG. 3d) from the transistor 40 of the flip-flop circuit 16 for a period of $t/2$. Thus the first AND circuit 19 remains off during the initial period of $t/4$ and retains the condition of $V_H$ and is turned on during the following $t/4$ period. Therefore the output from the first AND circuit 19 is "1" as shown in FIG. 3f. To the diode 55 of the second AND circuit 20 is supplied the output $V_L$ (FIG. 3h) from the transistor 32 of the multivibrator only for a period of $t/4$ and is also added the output $V_H$ for the next $t/4$ period. To the diode 54 is supplied the output $V_L$ (FIG. 3e) from the transistor 41 of the flip-flop circuit 16 for a period of $t/2$. Since the second AND circuit 20 is turned on throughout the period of $t/2$, the output therefrom is "0" during both first and second $t/4$ periods as shown in FIG. 3g. The operation of the OR circuit 21 which receives the outputs from the first and second AND circuits 19 and 20 is self-evident, so that it is only briefly described hereunder. During the initial $t/4$ period, the second AND circuit 20 has no output, whereas the first AND circuit 19 produces an output of "1" during the initial $t/4$ period. Thus during the initial $t/4$ period, the OR circuit 21 naturally sends forth an output of "1." This output from the OR circuit 21 leads to the increased voltage of the base region of the transistor 59 of the Schmidt circuit 22 connected to the OR circuit 21, thus causing the transistor 59 to be turned on as shown in FIG. 3i. The turn-on of the transistor 59 naturally lowers the voltage of the base region of the transistor 61 connected to the collector region of the transistor 59, thus causing the transistor 61, to be turned off as shown in FIG. 3j. Thereafter as indicated by the wave forms of FIGS. 3a to 3l, the transistors 40 and 41 are repeatedly turned on and off and the terminal voltage (FIG. 3k) of the stator exciting coil 18 displays a 90° phase lead over the terminal voltage (FIG. 3l) of the stator exciting coil 23. Thus due to the generation of an alternating field of 90° phase differential, the rotor 24 rotates in a prescribed direction. Now let us take a reverse case to the foregoing, where the transistor 40 of the flip-flop circuit 16 is turned off and the transistor 41 thereof is turned on when the source switch is closed. There will now be described this case by reference to FIGS. 3a to 3c and FIGS. 4a to 4i. When the differentiated pulse wave (FIG. 3c) of the multivibrator 11 is supplied to the flip-flop circuit 16 the transistor 40 is turned on and the transistor 41 is turned off. Under this condition, let us consider only a period of $t/4$. As previously mentioned, let the higher voltage be denoted by $V_H$ and the lower voltage by $V_L$. To the diode 52 of the first AND circuit 19 is supplied the output $V_H$ (FIG. 3a) from the transistor 31 of the multivibrator only for a period of $t/4$. To the diode 51 is added the output $V_L$ (FIG. 4a) from the transistor 40 of the flip-flop circuit 16 for a period of $t/2$. Thus the first AND circuit 19 is kept on by the transistor 40 for a period of $t/2$, so that its output is "0" as shown in FIG. 4c. Next let us consider the second AND circuit 20 which receives the output from the collector region of the transistor 32 of the multivibrator and the output from the collector region of the transistor 41 of the flip-flop circuit 16. To the diode 55 of the second AND circuit 20 is supplied the output $V_L$ (FIG. 3b) from the collector region of the transistor 32 of the multivibrator for a $t/4$ period to turn on the diode 55. On the other hand, to another diode 54 is added the output $V_H$ (FIG. 4a) from the collector region of the transistor 41 of the flip-flop circuit 16 to keep the diode 54 off. Therefore during the initial $t/4$ period, the second AND circuit has "0" output as shown in FIG. 4d. The OR circuit to which the outputs from the first and second AND circuits 19 and 20 are to be introduced, needless to say, receives no input at this time, so that the output from this OR circuit 21 is also "0" as shown in FIG. 4e. Consequently the transistor 59 of the Schmidt circuit 22, to the base region of which is introduced the output from the OR circuit 21, is kept off as shown in FIG. 4f and the transistor 61 thereof is kept on as shown in FIG. 4g. Introduction of pulses under such condition to the transistors 40 and 41 leads to the repetition of the on and off conditions of these transistors as shown in FIGS. 4a to 4i, causing the phase of the terminal voltage of the stator exciting coil 18 to advance 90° over that of the other exciting coil 23. The resultant generation of an alternating field of 90° phase differential causes the rotor 24 to rotate in a prescribed direction (the same direction as described above).

As seen from the description of the foregoing embodiment of the present invention, the drive means thereof enables the rotor to rotate in a prescribed direction, whether the transistors 40 and 41 of the flip-flop circuit 16 are turned on or off when power is introduced, thus offering a great practical effect. The aforesaid embodiment relates to the case where the transistor has an NPN junction. However, the use of a transistor having a PNP junction will have the same effect. Although the embodiment also uses a Schmidt circuit as an amplifier, it will be apparent that the present invention is not restricted thereby.

Figure 2:
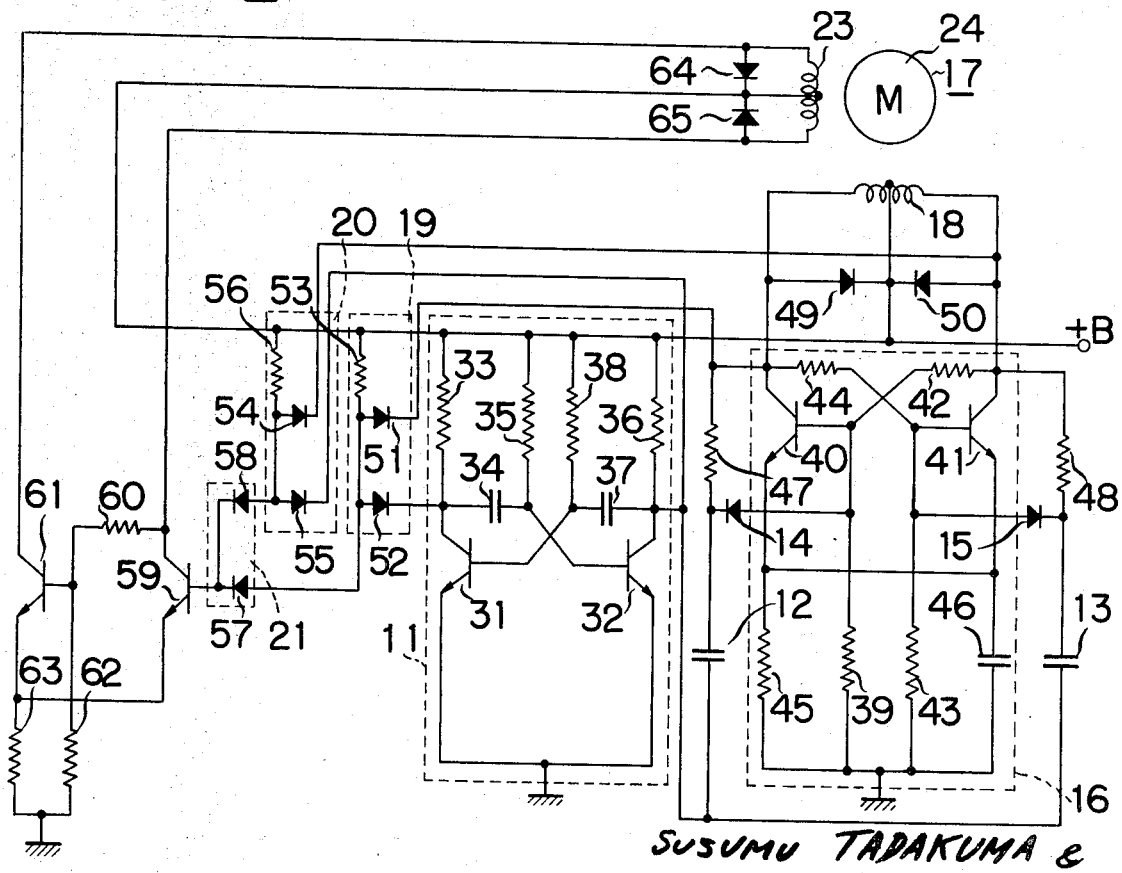
FIG. 2 is a concrete connection chart of the circuit of FIG. 1.
Figure 5:
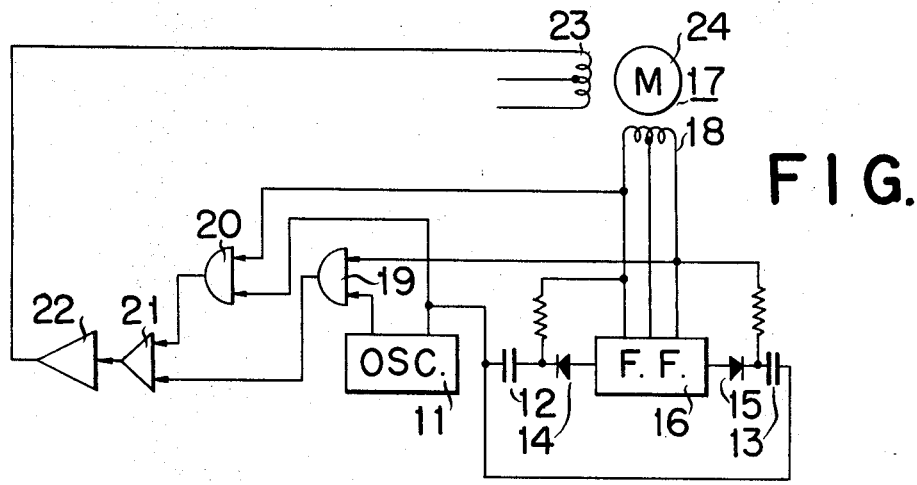
FIG. 5 is a schematic diagram of the circuit involved in a modification of the embodiment of FIG. 1.

As shown in FIG. 5, it is also possible to reverse the rotation of the rotor 25 of the 2-phase motor 17 (namely, in an opposite direction to that of the preceding case) by exchanging the inputs to the first and second AND circuits 19 and 20 for each other in relation to the drive means of FIG. 1. The same parts of FIG. 5 as those of FIGS. 1 and 2 are denoted by the same numerals and description thereof is omitted. The paired diodes 49–50 and 64–65 inserted into a pair of stator exciting coils 18 and 23 respectively may be eliminated, as far as the object of the present invention is concerned.

There will now be described another embodiment of the present invention by reference to FIG. 6 and following ones. The same parts of this embodiment as those of the preceding are represented by the same numerals.

Figure 6:
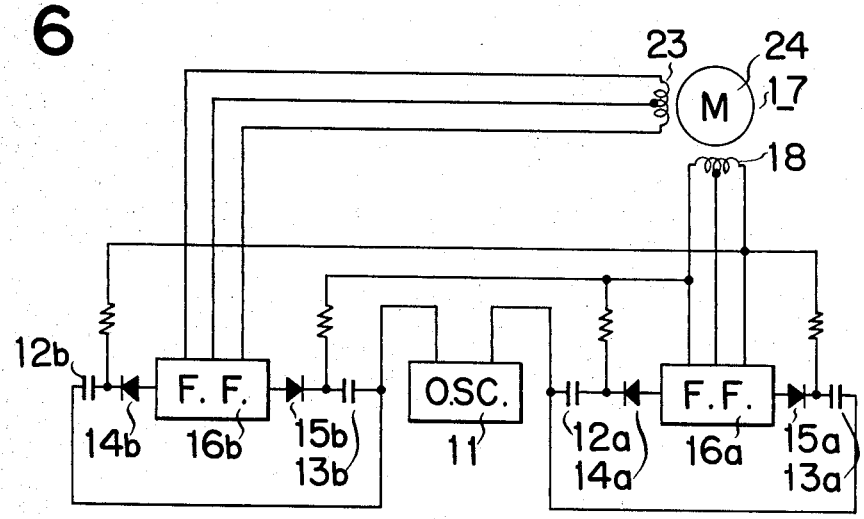
FIG. 6 is a schematic diagram of the circuit associated with another embodiment of the drive means of the invention for a 2-phase motor.

In FIG. 6, the outputs from the low frequency wave oscillator 11 are so connected as to enter the first and second flip-flop circuits 16a and 16b respectively.

To the first flip-flop circuits 16a is connected the first stator exciting coil 18 of the 2-phase motor 17. Similarly to the second flip-flop circuit 16b is connected to second stator exciting coil 23. The output side of the collector region of the first flip-flop circuit 16a is connected to the input side of the base region of the second flip-flop circuit 16b. What is required in such arrangement is that the output signal from the first flip-flop circuit 16a be advanced in respect of phase over the output signal from the second flip-flop circuit 16b. This is intended to cause the rotor 24 to rotate in a fixed direction by interlocking the input to the second flip-flop circuit 16b with the output from the first flip-flop circuit 16a. In other words, with the output from a circuit for supplying a prescribed signal, for example, a leading current (voltage) to the stator exciting coils 18 and 23 of the 2-phase motor 17, is interlocked the input to a circuit for supplying a prescribed signal, for example, a lagging current (as compared with the phase of the aforementioned current) to the stator exciting coils 18 and 23. There will now be concretely described this embodiment by reference to FIG. 7.

Figure 7:
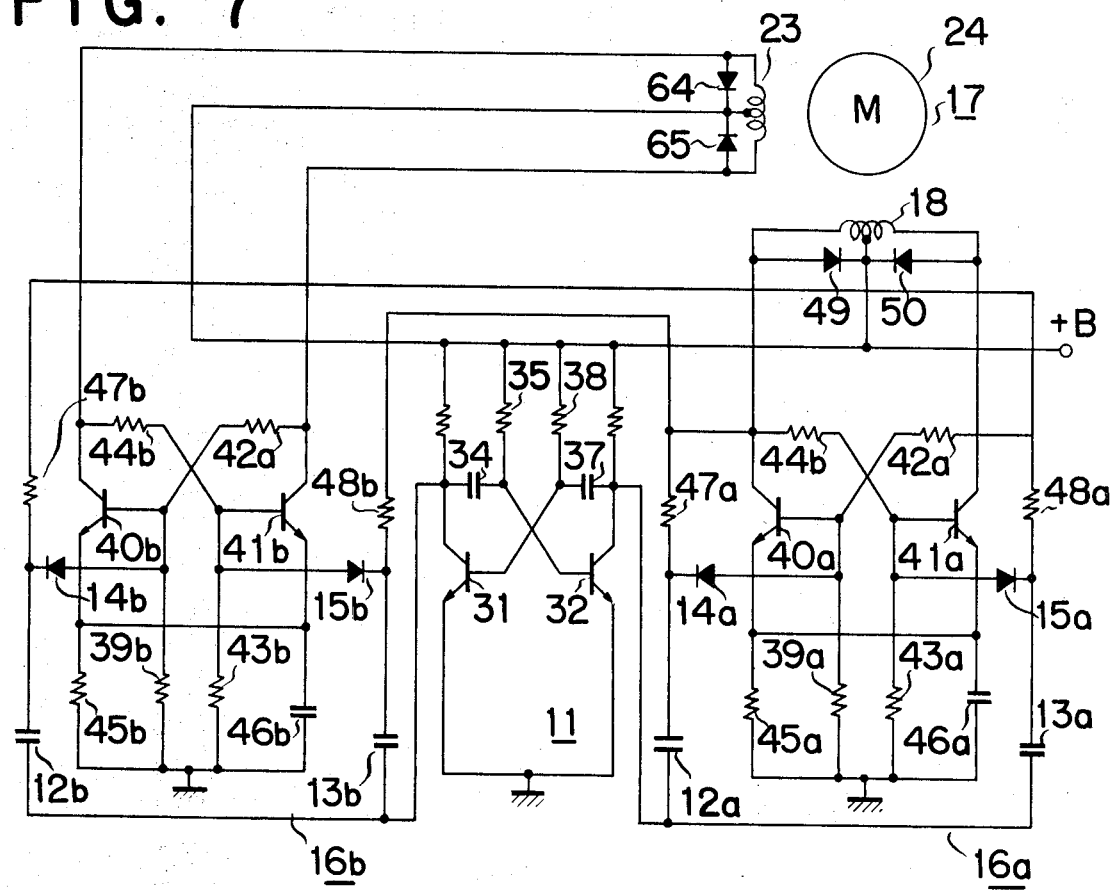
FIG. 7 is a concrete connection chart of the circuit used in the drive means of FIG. 6.
Figure 8A:
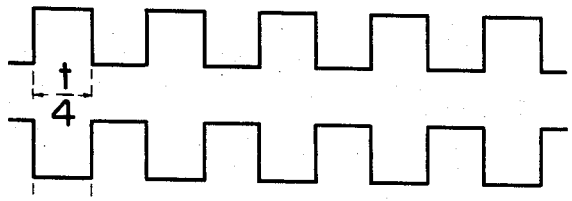
Figure 8C:
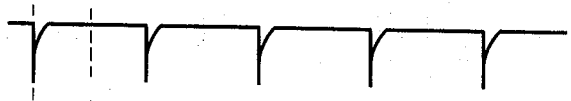
Figure 8D:
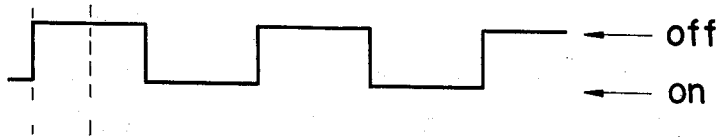
Figure 8E:
Figure 8F:
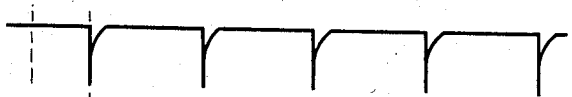
Figure 8G:
Figure 8H:
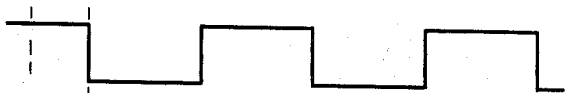
Figure 8I:
Figure 8J:
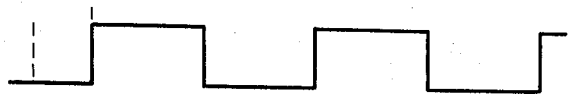
Figure 9A:
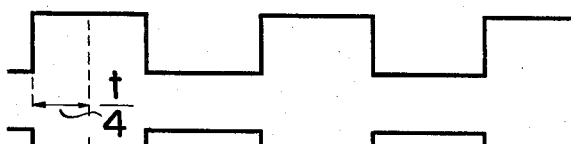
Figure 9B:
Figure 9C:
Figure 9D:
Figure 9E:
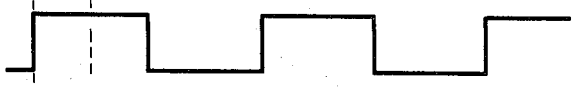
Figure 9F:

The circuits 16a and 16b of FIG. 7 respectively have the same construction as the circuit 16 of FIG. 2, so that description of the construction of the circuits of FIG. 7 is omitted. There will hereinafter be detailed the function and operation of this embodiment by reference to the appended FIGS. 8a to 8j and FIGS. 9a to 9f, which respectively represent the following:

FIG. 8a=wave form of collector voltage of transistor 1
FIG. 8b=wave form of collector voltage of transistor 2
FIG. 8c=wave form of input signal to transistors 3 and 4
FIG. 8d=wave form of collector voltage of transistor 3
FIG. 8e=wave form of collector voltage of transistor 4
FIG. 8f=wave form of input signal to transistors 5 and 6
FIG. 8g=wave form of collector voltage of transistor 5
FIG. 8h=wave form of collector voltage of transistor 6
FIG. 8i=wave form of terminal voltage of first stator exciting coil
FIG. 8j=wave form of terminal voltage of second stator exciting coil
FIG. 9a=wave form of collector voltage of transistor 3
FIG. 9b=wave form of collector voltage of transistor 4
FIG. 9c=wave from of collector voltage of transistor 5
FIG. 9d=wave form of collector voltage of transistor 6
FIG. 9e=wave form of terminal voltage of first stator exciting coil
FIG. 9f=wave form of terminal voltage of second stator exciting coil Due to inevitable variations in the quality of transistors, it is generally impossible to foresee which of them is turned on or off when power is introduced. Therefore let us take the case where the transistors 40a and 40b are turned on and the transistors 41a and 41b are turned off when the source switch is closed. The cathode side of the diode 14b is clamped to the collector potential of the transistor 41a of the first flip-flop circuit 16a. Since the transistor 41a is under an "off" condition, the diode 14b is biased to a positive potential. The diode 15b is clamped to the collector potential of the transistor 40a which is turned on (saturated). When, under such condition, the differentiated output from the multivibrator as shown in FIG. 8c is supplied to the first flip-flop circuit 16a, then the transistor 40a is turned off and the transistor 41a is turned on. Thus the cathode side of the diode 15b is clamped to the collector potential of the transistor 40a which has been turned off, so as to be biased to a positive potential. On the other hand, the cathode of the diode 14b is clamped to the collector potential of the transistor 41a which has been turned on. At this time, namely, after a lapse of a t/4 period from the time when the output from the multivibrator was supplied to the first flip-flop circuit 16a, the differentiated output signal (FIG. 8f) from the same multivibrator is added to the second flip-flop circuit 16b. Then the output signal from the diode 15b whose cathode side is biased to a positive potential is transmitted through the diode 14b to the base region of the transistor 40b. Therefore, as shown in FIGS. 8g and 8h, the transistor 40b is turned off and the transistor 41b is turned on. Thereafter as shown in FIGS. 8a to 8j, the transistors 40a, 40b, 41a and 41b are alternately turned on and off in repetition. Thus as in FIGS. 8a to 8j, the phase of the terminal voltage (FIG. 8i) of the stator exciting coil 18 advances 90° over the terminal voltage (FIG. 8j) of the stator exciting coil 23. Accordingly there is generated an alternating field of 90° phase differential to cause the rotor 24 to rotate in a fixed direction.

Figure 10:
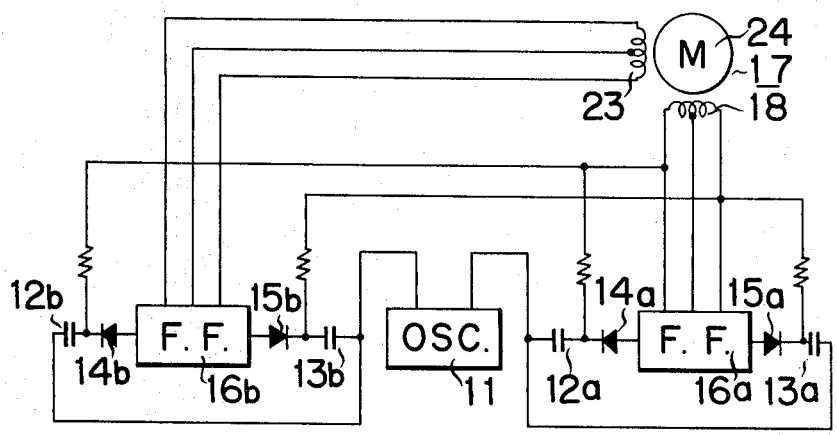
FIG. 10 is a schematic diagram of the circuit used in a modification of the embodiment of FIG. 6.

Next let us take the case where, when the source voltage is closed, the transistors 40a and 41a of the first flip-flop circuit 16a are turned on and off respectively while the transistors 40b and 41b of the second flip-flop circuit 16b are turned off and on respectively, as shown in FIGS. 9a to 9f. The cathode side of the diode 15b is clamped to the collector potential of the transistor 40a which is turned on, and the cathode side of the diode 14b is clamped to the collector potential of the transistor 41a which is turned off. When the differentiated output (FIG. 8c) from the multivibrator is supplied to the first flip-flop circuit 16a, the transistor 40a is turned off and the transistor 41a is turned on. Thus the diode 15b is clamped to the collector potential of the transistor 41a which has been turned off and biased to a positive potential. On the other hand, the diode 14b is clamped to the collector potential of the transistor 41a which has been turned on. When the differentiated output (FIG. 8f) from the multivibrator is supplied to the second flip-flop circuit 16b after a lapse of a t/4 period from the time when the differentiated output from the multivibrator was added to the first flip-flop circuit 16a, then the differentiated signal is supplied through the diode 14b to the base region of the transistor 40b, because the diode 15b is biased to a positive potential. However, the transistor 40b which has been turned off is kept in this state as shown in FIG. 9c and the transistor 41b retains an "ON" condition as shown in FIG. 9d. When the differentiated output signal (FIG. 8c) from the multivibrator is supplied to the first flip-flop circuit 16a after a lapse of a t/2 period from the time when said circuit was actuated, then the transistor 40a is turned on and the transistor 41a is turned off. Thus the diode 14b is clamped to the collector potential of the transistor 41a which has been turned off and biased to a positive potential. On the other hand, the diode 15b is clamped to the collector potential of the transistor 40a which has been turned on. When, after a lapse of a t/4 period from this point, the differentiated output signal (FIG. 8f) from the multivibrator is supplied to the second flip-flop circuit 16b, then the output signal is added through the diode 15b to the base region of the transistor 41b, because the diode 14b is biased to a positive potential. Thus the transistor 40b is turned on and the transistor 41b is turned off. Thereafter, as shown in FIGS. 9a to 9f, the transistors 40a, 41a, 40b and 41b are alternately turned on and off in repetition. Accordingly, as shown in FIGS. 9a to 9f, the phase of the terminal voltage of the first stator exciting coil 18 advances 90° over that of the second stator exciting coil 23. Due to the resultant generation of an alternating field of 90° phase differential, the rotor 24 is caused to turn in the same direction as in the previous case. FIG. 10 represents a modification of this embodiment, as shown in the figure, a slight modification of the method of providing a circiut connection allows the rotor to rotate in a reverse direction to what was described above. The same parts of FIG. 10 as those of FIG. 6 are denoted by the same numerals and description thereof is omitted.

The aforementioned embodiments of the present invention enable the rotor of a 2-phase motor to rotate in a prescribed direction, regardless of the on or off condition of the flip-flop circuit, simply by interlocking the input to a circuit for supplying a lagging current with the output from a circuit for supplying a leading current to a stator exciting coil. Consequently the invention is remarkably useful in practical application.

Figure 11:
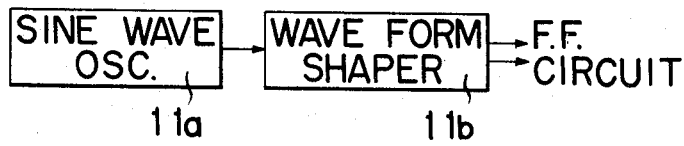
FIG. 11 is a block diagram illustrating an example of the rectangular wave signal oscillating circuit used in the invention.

While all the foregoing embodiments used an NPN junction transistor, the use of a PNP junction transistor will have the same effect. Also throughout the embodiments was used a multivibrator as a low frequency wave oscillator. However, it will be apparent that the present invention is not restricted thereby. For example, as shown in FIG. 11, it is permissible to use a common CR oscillator. In this case, the sine wave from a sine wave oscillator 11a is supplied to a wave form shaper 11b to be converted to a rectangular wave. The wave form shaper 11b may consist of any known type, so that description thereof is omitted.

While the invention has been described in connection with some preferred embodiments thereof, the invention is not limited thereto and includes any modifications and alterations which fall within the scope of the invention as defined in the appended claims.

What is claimed is:

1. Drive means for a two-phase motor having a rotor and first and second stator exciting coils, comprising:
   an oscillator generating a substantially rectangular wave signal;
   a multivibrator circuit coupled to and driven by the output of said oscillator;
   means coupling said first stator exciting coil across the output terminals of said multivibrator circuit; and
   an AND circuit having one input thereof coupled to an output of said oscillator and the other input thereof coupled to an output of said multivibrator circuit, the output of said AND circuit being coupled to supply an exciting current to said second stator exciting coil.

2. Drive means for a two-phase motor having a rotor and first and second stator exciting coils comprising:
   an oscillator generating first and second substantially rectangular wave signals of opposite polarity;
   a multivibrator circuit driven by said first signal generated by said oscillator;
   means coupling said first stator exciting coil across the output terminals of said multivibrator circuit;
   first and second AND circuits, an input of each of said AND circuits being coupled to receive, respectively, one of said first and second signals generated by said oscillator; and
   an OR circuit having two inputs, each input being connected to an output of each of said AND circuits, respectively, the output of said OR circuit supplying an exciting current to said second stator exciting coil.

References Cited

UNITED STATES PATENTS 3,348,109  10/1967  Wright _____ 318—138
3,416,057  12/1968  Froyd et al. _____ 318—227

ORIS L. RADER, Primary Examiner

G. ROBINSON, Assistant Examiner

U.S. Cl. X.R.

318—138, 311